United States Patent [19]

Folkens et al.

[11] Patent Number: 5,040,913
[45] Date of Patent: Aug. 20, 1991

[54] DEVICE FOR GENERATING AND/OR IMPRINTING FORMS

[75] Inventors: Dieter Folkens, Bockhorn; Wolfgang Endres, Wilhelmshaven, both of Fed. Rep. of Germany

[73] Assignee: AEG Olympia Office GmbH, Wilhelmshaven, Fed. Rep. of Germany

[21] Appl. No.: 500,455

[22] Filed: Mar. 28, 1990

[30] Foreign Application Priority Data

Mar. 28, 1989 [DE] Fed. Rep. of Germany ....... 3910077

[51] Int. Cl.$^5$ .......................................... B41J 29/15
[52] U.S. Cl. .................................. 400/718.1; 400/85; 400/709.2; 400/705; 40/353
[58] Field of Search ............... 400/707.2, 707.3, 707.4, 400/705, 709, 709.1, 709.2, 718, 718.1, 84, 85; 40/352, 353, 356

[56] References Cited

U.S. PATENT DOCUMENTS

| | | | |
|---|---|---|---|
| 3,129,695 | 4/1964 | Adelman | 40/352 |
| 3,703,989 | 10/1973 | Goldman | 400/718.1 |
| 3,803,971 | 4/1974 | del Castillo | 40/356 |
| 4,055,908 | 11/1977 | Greene et al. | 40/352 |
| 4,159,836 | 7/1979 | Tarr | 40/352 |
| 4,385,461 | 5/1983 | Wingfield | 40/352 |
| 4,656,764 | 4/1987 | Fengler | 40/352 |
| 4,760,661 | 8/1988 | Yoshikoshi et al. | 40/356 |
| 4,867,592 | 9/1989 | Crawford | 400/709 |
| 4,893,775 | 1/1990 | Long | 400/718 |

FOREIGN PATENT DOCUMENTS

| | | | |
|---|---|---|---|
| 0029184 | 2/1984 | Japan | 400/718.1 |
| 0159380 | 9/1984 | Japan | 400/718 |
| 0277476 | 12/1986 | Japan | 400/705 |
| 0279572 | 12/1986 | Japan | 400/718 |
| 0139775 | 6/1988 | Japan | 400/718 |
| 2145038 | 3/1985 | United Kingdom | 400/718 |

OTHER PUBLICATIONS

IBM Technical Disclosure Bulletin, "Typewriter Printing Point Indicator", vol. 9, No. 11, Apr. 1967, p. 1587.

Primary Examiner—Clifford D. Crowder
Assistant Examiner—John S. Hilten
Attorney, Agent, or Firm—Spencer & Frank

[57] ABSTRACT

A positioning unit for use in completing forms at a word processing station having a display unit, a computer, a text input device and a printer. The positioning unit has a transparent contact plate into which a copy of the form is placed and underneath which a movable position marker directs onto the copy a light dot which is moved in synchronism with a cursor on a screen of a display unit. The position marker is mounted on a frame below the contact plate and is movable in line and column directions parallel to the contact plate so as to follow the movement of the cursor, so that an operator can observe where on a corresponding form in the printer text entered into a computer via the input device and viewable on the screen, will be typed on the printer.

19 Claims, 3 Drawing Sheets

DEVICE FOR GENERATING AND/OR IMPRINTING FORMS

REFERENCE TO RELATED APPLICATIONS

This application claims the priority of Federal Republic of Germany application Serial No. P 39 10 077.4 filed Mar. 28th, 1989, which is incorporated herein by reference.

BACKGROUND OF THE INVENTION

1. Field of the Invention

The present invention relates to a device for generating and/or imprinting forms, including fields to be imprinted and fields not be imprinted. More particularly, the invention relates to a device for generating and/or imprinting such forms by means of a word processing station at which text, input with the aid of a keyboard and stored in the operating memory of a computer, is displayed on the screen of a display device and is later printed on the form as it is read out of the operating memory.

2. Description of the Prior Art

Word processors are often equipped with a display on which the characters of at least a portion of one line of text can be displayed. Characters input to a word processor by means of a keyboard are stored in a text memory and are simultaneously displayed on the display device without actuating the printer. In this way, it is possible to check the text which has been input, and make necessary corrections before printing. The characters which have been input can be printed out in one of a number of ways: (1) after actuation of a special key, (2) automatically at the end of a line, or (3) upon the occurrence of a special event, e.g., after actuation of the space bar at the end of a word.

Such a delayed printout is acceptable for normal text input, but leads to considerable difficulties for the operator when writing on forms or similar pre-printed material because the display device does not give the operator an opportunity during character input to monitor the location on the form at which the characters will be printed. A determination of whether and when a space in the form is used up could at best be made by counting the characters.

DE-A 13,229,615 discloses a system and a method, for filling out an existing form which is inserted in the printer of the word processing station. Markers are displayed at locations on the display which correspond to the beginning and/or end of a variable field to be inscribed on the form, so as to give the operator an orientation aid on the display. Additionally, the display may show explanatory texts in protected fields to indicate, in each case, what is to be entered into the respective region to be filled out. These protected fields cannot be easily used by the operator. During printout of the contents of the display screen on the form, neither the texts of the protected fields nor the markers are printed. This prior art method is suited exclusively for filling out forms that are already available in printed form. It is not suitable for the development of forms.

SUMMARY OF THE INVENTION

It is therefore an object of the invention to provide a device by means of which a form can be easily imprinted and/or generated using a word processor station. This is accomplished in accordance with the invention, by a system which includes a positioning unit in combination with a word processing station provided with a computer having an operating memory for storing text, a keyboard for inputting the text to the operating memory, a display device for displaying the text as it is input to the operating memory by the keyboard, and a printer for later printing onto the form the text stored in the operating memory. The positioning unit includes a transparent contact plate onto which the form is placed. The positioning unit also includes a position marker means which provides a light dot below the contact plate to be moved parallel to the contact plate, in column and row directions, in synchronism with a cursor on the screen of the display device. The positioning unit is connected with the computer and the printer, by way of electrical cables.

By means of a separate light dot, the positioning unit effectively makes visible on a printed form to be inscribed, the position of the screen cursor. Any pitch realizable by the connected printer can here be employed. Further advantages are that it is possible for the first time to fill out a pre-printed form by means of a computer system having a conventional low resolution screen, and that the development of forms on the screen is facilitated considerably.

BRIEF DESCRIPTION OF THE DRAWINGS

These and other features and advantages of the invention may be more completely understood from the following detailed description of the preferred embodiments of the invention with reference to the accompanying drawings in which.

DETAILED DESCRIPTION OF THE PREFERRED EMBODIMENTS

Figure 1:
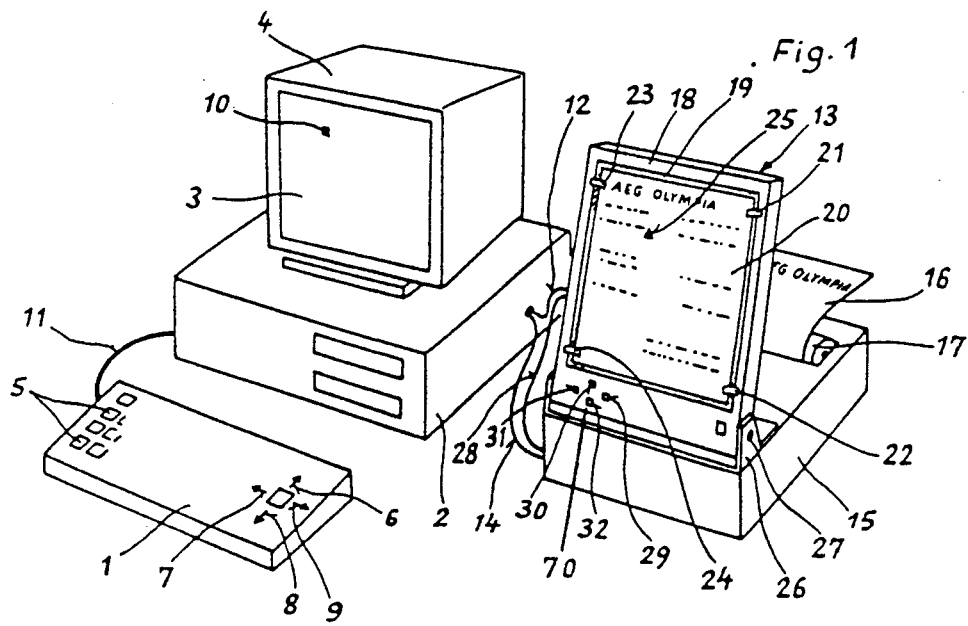
FIG. 1 is a perspective representation of a word processing station according to the invention.

FIG. 1 shows a device for generating and/or imprinting forms having fields which are to be imprinted upon and fields which are not to be imprinted upon. The device includes a word processing station in which characters, input with the aid of a keyboard 1 and stored in the operating memory of a computer 2, are displayed on the screen 3 of a display device 4. The keyboard is equipped with conventional alpha-numeric keys 5 and positioning keys 6, 7, 8 and 9, with which a cursor 10 can be displaced on the screen 3 in a known manner. The keyboard 1 is connected with the computer 2 by a cable 11. The computer 2, in turn, is connected by an electrical cable 12 with a positioning unit 13 and by an electrical cable 14 with a printer 15. The printer 15 serves in a known manner to imprint on a form 16 characters read out of an operating memory of the computer 2. Forms 16 are transported by means of a drive roller (platen) 17 which is driven by a drive motor (not shown in the drawings).

Positioning unit 13 includes a frame 18 in which a transparent (e.g., glass) contact plate 19 is disposed. A form 20 can be placed on the contact plate 19. A position marker 25 (see FIG. 2) is mounted below the contact plate 19 so as to be movable parallel to the contact plate 19 in line and column directions. The position marker outputs a light dot 25', and is movable in synchronism with movement of the cursor 10. The positioning unit 13 is controlled from the computer 2 via cable 12. The positioning unit is also connected via an electrical cable 28 to the printer 15 and the printer is connected to the computer 2 via an electrical cable 14.

A form 20 is held in a fixed position on the contact plate 19 by means of clamps 21, 22, 23 and 24 which are connected with the frame 18. Located below the lower edge of the contact plate 19 in the frame 18 is a control panel 70 including positioning keys 29, 30, 31, and 32, with which the position marker 25 can be displaced as desired behind the contact plate 19.

The positioning unit 13 is pivotally mounted on the upper face of the printer 15. The pivotal mounting is obtained with bearing pins 27 which project outwardly from the sides of the positioning unit into bearing bores formed in bearing blocks 26 which are fixed on the printer. Alternatively, the positioning unit 13 and printer 15 may be separated.

Figure 2:
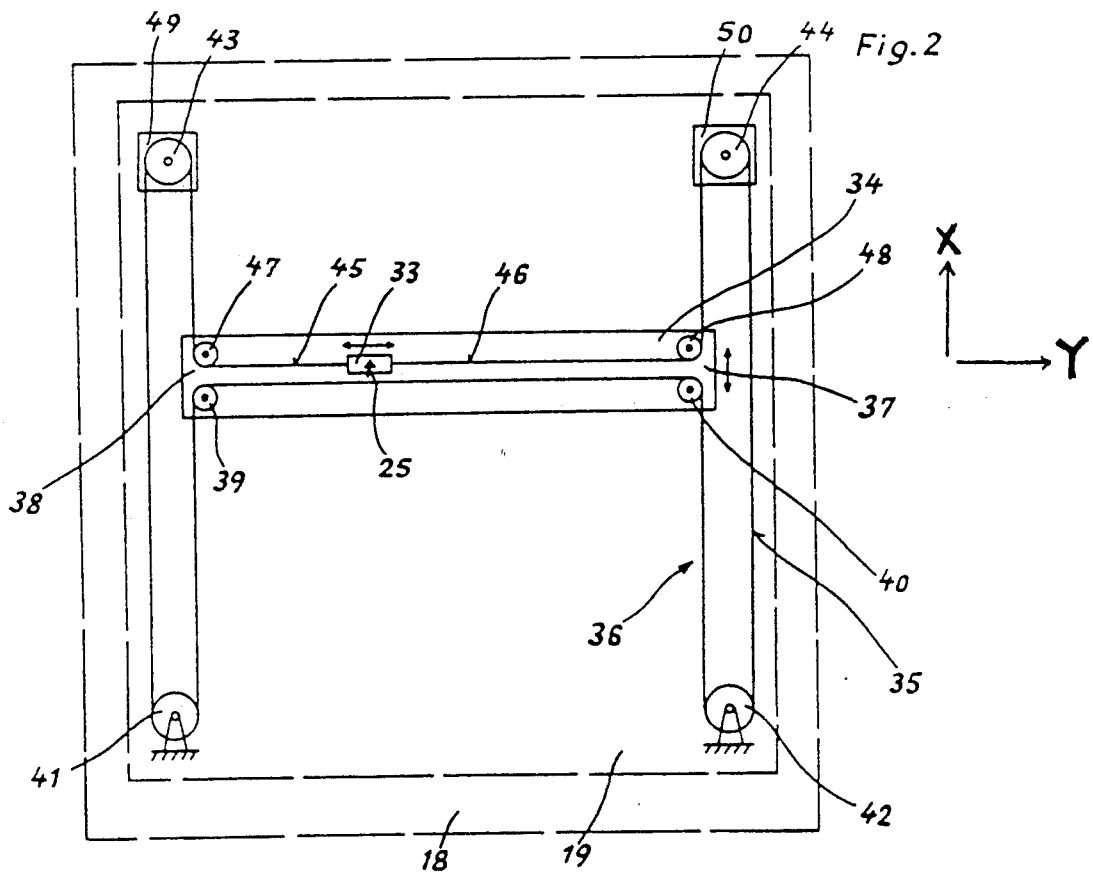
FIG. 2 schematically illustrates a positioning unit with a position marker, according to a first embodiment of the invention.

FIG. 2 illustrates an embodiment of the positioning unit 13 in which the position marker 25 is fixed on a carriage 33. The carriage 33 is mounted so as to be displaceable by a drive in the line direction (horizontal or X-direction) on a rail-like carrier 34. The carrier 34 is oriented in the line direction and is displaceable in the column direction (vertical or Y-direction) by means of a drive. Thus, the position marker 25 is movable in both the X and Y directions below contact plate 19 in order to display positions on the form 20 corresponding to the positions of the cursor 10. The positions of the carrier 34 and the carriage 33 can be adjusted individually or together by means of a single cable drive. For this purpose, a cable 35 of a cable drive 36 is guided around reversal rollers 39 and 40 disposed at the opposite ends 37 and 38 of the carrier 34 to two reversal rollers 41 and 42, which are mounted to the frame 18 in the region of the lower corners of contact plate 19. From the reversal rollers 41 and 42, the cable then travels to two reversal rollers 43 and 44, which are mounted to the frame 18 in the region of the upper corners of the contact plate 19. The ends 45 and 46 of the cable 35 coming from the upper reversal rollers 43 and 44 are respectively guided over further reversal rollers 47 and 48 which are mounted to the ends 37 and 38 of the carrier 34, thereby to reach the carriage 33 to which they are fastened. In order to displace the carriage 33, one of the two reversal rollers on each side of contact plate 19, that is one of rollers 41 and 43 and one of rollers 42 and 44, must be driven by a respective drive motor. According to FIG. 2, the reversal roller 43 is driven by the drive motor 49 and the reversal roller 44 is driven by the drive motor 50.

If both of the drive motors 49 and 50 are rotated in the same direction at the same rate, the carriage 33 is displaced horizontally without any vertical movement of the carriage 34. If, on the other hand, the two motors 49 and 50 rotate in opposite directions at the same rate, the carrier 34 is moved vertically without any horizontal movement of the carriage 33. Thus, by simple actuation of the respective drive motors 49 and 50 in appropriate directions and at appropriate speeds, it is possible to displace the position marker 25 as desired underneath the contact plate 19. The respective drive pulses to the drive motors 49 and 50 are provided by the computer 2 which receives its control instructions either from the keyboard 1 or from the positioning keys 29, 30, 31 and 32 of the control panel 70.

Figure 3:
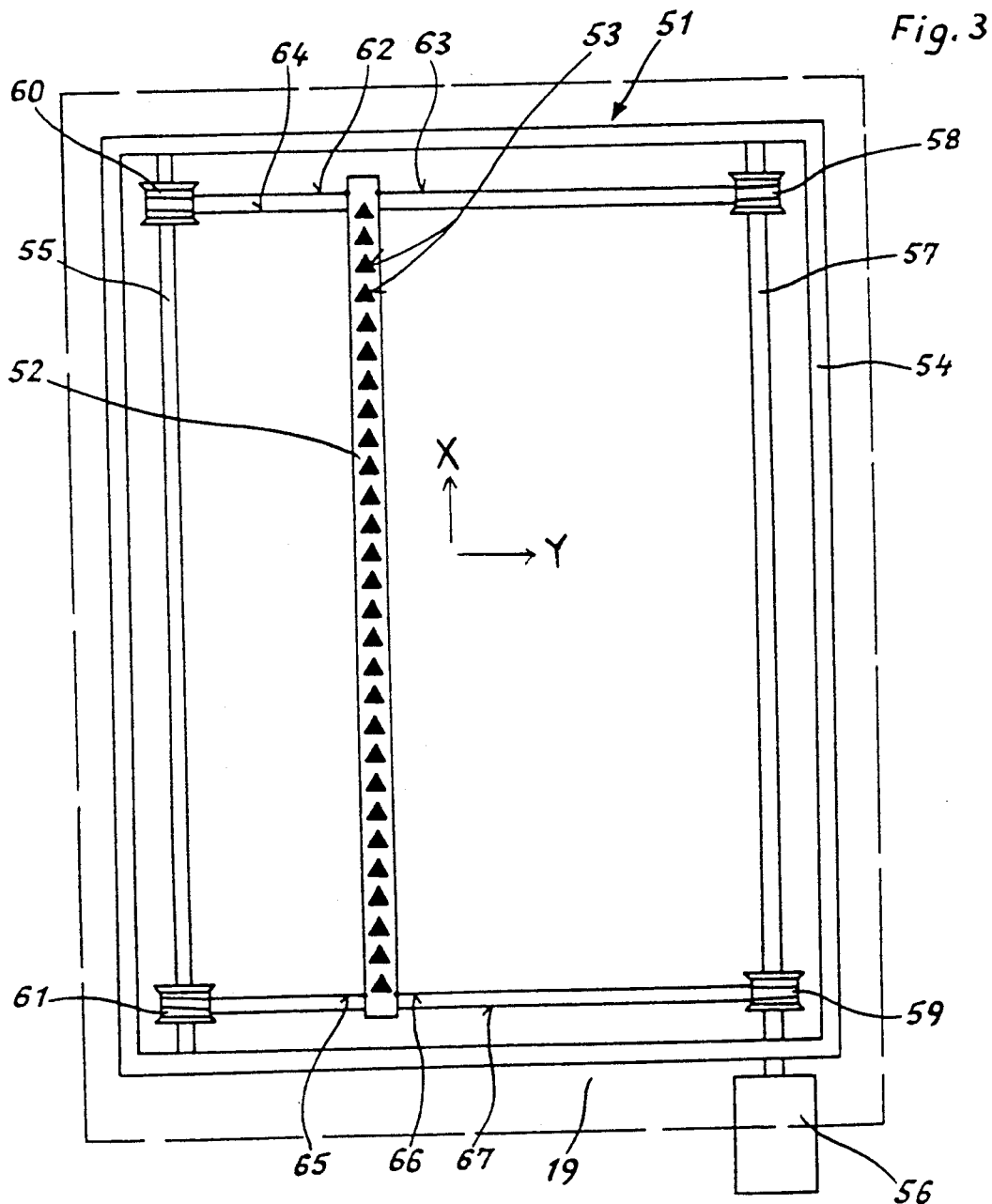
FIG. 3 schematically illustrates a positioning unit including a carriage provided with a column of position markers, according to a second embodiment of the invention.

FIG. 3 shows a positioning unit 51 in accordance with a second embodiment of the invention. The positioning unit 51 may be pivotally mounted on the printer 26, or not, as in the first embodiment. The positioning unit 51 includes a carriage 52 that can be displaced in the line direction (the horizontal or X-direction) underneath the transparent contact plate 19, by means of a drive. The carriage 52 extends in the column direction (vertical or Y-direction). Individually actuatable position markers 53 are provided for each line. Each position marker 53 is actuatable to produce a light dot. The position markers 53 are equally spaced apart in the column direction, and are equal in number to the highest possible number of lines of the form 20 clamped on the contact plate 19. The contact plate 19 of the positioning unit 51 is supported on a frame 54 in which are mounted a shaft 55 along the one longitudinal side of the contact plate 19 and a drive shaft 57 along the other longitudinal side. The drive shaft 57 is driven by a drive motor 56. Two pulleys 58 and 59 are fixed respectively to the upper and lower ends of the drive shaft 57, while two pulleys 60 and 61 are mounted so as to be freely rotatable on the respective upper and lower ends of the shaft 55. A cable 64 is looped about the upper pulleys 58 and 60, and a cable 67 is looped about the lower pulleys 59 and 61. Free ends 62 and 63 of the cable 64 and free ends 65 and 66 of the cable 67 are fixed to the carriage 52. The horizontal movements of the position markers 53, and thus the light dot emitted by the actuated position markers 53, are generated by the drive motor 56, while a vertical line shift of the light dot is generated by a switch to the next position marker 53. The position of the carriage 52 and the selected position marker are of course controlled from the keyboard 2 or the control panel 70. Half-line shifts could be accomplished by a vertical shift of the carriage 52 or represented by switching on two position markers 53.

The position markers 25 and 53, are composed, for example, of light emitting diodes, and emit light beams through preferably triangular, light exiting surfaces.

Figure 4:
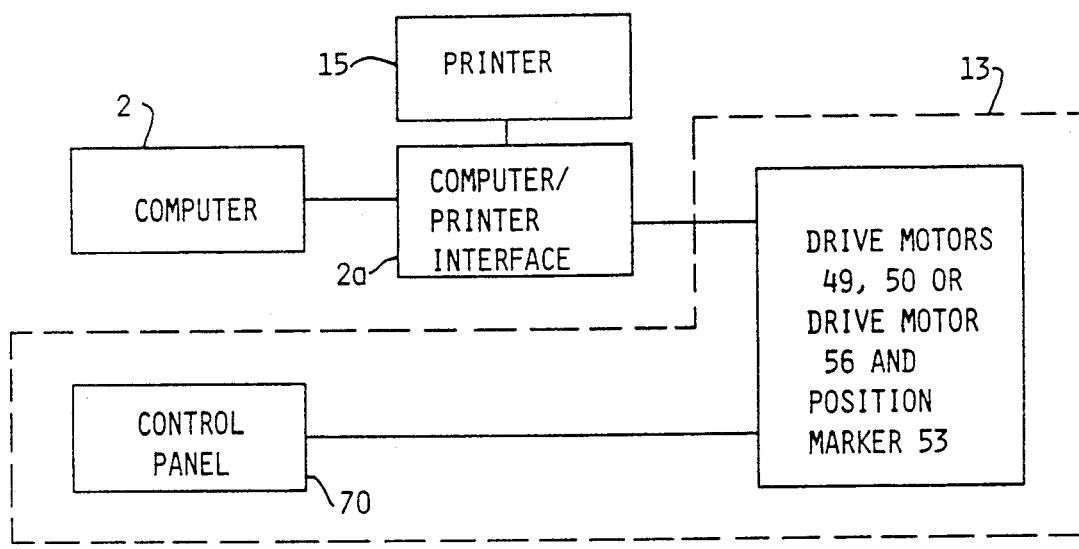
FIG. 4 is a block diagram of the embodiments of FIGS. 2 and 3 utilizing the computer/printer interface for connection of the computer to the positioning unit.

If a text is input to the operating memory of the computer 2 by way of the keyboard 1, the cursor 10 travels from the left to the right on the screen 3 according to the number of characters. In synchronism therewith, the light dot emitted by the position marker 25 or 53 moves on the form 20 which is held on the contact plate 19 by means of the clamps 21, 22, 23, and 24. Actuation of the return key, or the cursor reaching a preselected right margin marker, causes the cursor 10 to return to the left margin and at the same time to jump down one line. The position marker 25 or 53 moves in the same way. In order to be able to transmit the cursor position to the positioning unit, it is of course necessary to activate a driver program in the computer 2. The purpose of this program is to immediately report any change in the cursor position, in the selection of type, and in the pitch, to the positioning unit, by way of an interface. This can be accomplished by way of an interface provided in addition to a normal computer/printer interface at the printer. Alternatively, this is accomplished by way of the normal computer/printer interface at the printer, as shown in the block diagram of FIG. 4, in which case the printer 15 must be connected to the positioning unit 13. The driver program must be designed in such a way that only those cursor steps are followed by the position marker 25 of the first embodiment or the actuated position marker 53 of the second embodiment, that are to be performed by the printer. Thus, control characters would not be followed by the position marker 25 or 53.

In order to fill out a form, the person operating the keyboard must initially actuate the space bar, the tab key or cursor keys 29, 30, 31, and 32 of the control panel 70, so as to bring the position marker 25 or the actuated position market 53 to the location on the form 20 at which text is to be inserted.

For printout of the finished form 16, either a preprinted form must be inserted into the printer or an appropriately stored pattern must be called up from the computer memory.

When filling out preprinted forms, the light dot emitted by the position marker indicates the position on the form corresponding too position of the cursor in the simplest manner. Each character position is shown accurately, with differences in pitch being taken into consideration. Thus, it is possible to fill out pre-printed forms on computer systems having the conventional low resolution screens. For use with this device, new forms can also be generated, in which case it is of advantage that the whole sheet is visible. It is also very easy with this device to change an already existing form.

The device for generating and/or imprinting a form would work properly if in addition to cable 12 only one of the cables 14 and 28 is provided. The vital point is that there are means, coupled between the position marker means and the computer, for controlling the position of the light dot so as to be in synchronism with movement of the cursor on the screen. Furthermore, the computer is connected to the printer to imprint the forms. Referring to FIG. 1 there are three cables 12, 14 and 28 giving the operator more flexibility.

It will be understood that the above description of the present invention is susceptible to various modifications, changes and adaptations, and the same are intended to be comprehended within the meaning and range of equivalents of the appended claims.

What is claimed is:

1. A device for generating and/or imprinting a form, the forms including fields to be imprinted and fields not be imprinted, comprising:
   a computer having an operating memory;
   a keyboard for inputting into the operating memory characters to be stored and later read out for printing;
   a display device having a screen for displaying the characters input by the keyboard;
   a printer for printing on the form the characters read out of the operating memory; and
   a positioning unit including
      a transparent contact plate onto which the form is placed during the inputting of characters, and
      a position marker means, disposed underneath the contact plate, for directing a light dot through the contact plate onto the form, and means for moving the light dot parallel to the contact plate in column and line directions, in synchronism with movement of a cursor on the screen; and
      electrical cables respectively connecting the positioning unit with the computer and the printer.

2. A device as in claim 1, wherein the moving means includes a carriage, a rail-like carrier, the position marker means being fixed to the carriage, the carriage being oriented in the line direction, the carriage being mounted on the carrier for movement on the carriage in the line direction, the moving means further comprising a drive means for displacing the carriage in the line direction and displacing the carrier in the column direction, whereby the position marker means is movable underneath the contact plate in the line and column directions so that the light dot directed by the position marker means onto the form displays a position on the form which corresponds to the position of the cursor on the screen.

3. A device as in claim 2, wherein the drive means includes a drive cable drive for alternatively moving the carriage individually or moving the carrier and the carriage jointly.

4. A device as in claim 3, wherein the contact plate has first and second lower corners and first and second upper corners; the cable drive including a cable and first and second drive motors; the drive means further comprising first and second reversal rollers disposed at respective first and second opposite ends of the carrier, third and fourth reversal rollers fixedly disposed in respective regions of the first and second lower corners of the contact plate, fifth and sixth reversal rollers fixedly disposed in respective regions of the first and second upper corners of the contact plate, and seventh and eighth reversal rollers respectively disposed at the first and second ends of the carrier; the cable being guided in succession from a first end of the cable over the seventh, fifth, third, first, second, fourth, sixth and eighth reversal rollers to a second end of the cable; the first and second ends of the cable being fastened to the carriage; the first drive motor driving one of the third and fifth reversal rollers; the second drive motor driving one of the fourth and sixth reversal rollers.

5. A device as in claim 4, wherein the first drive motor drives the fifth reversal roller and the second drive motor drives the sixth reversal roller.

6. A device as in claim 2, wherein the positioning unit further comprises positioning keys disposed below a lower edge of the contact plate, the moving means being responsive to actuation of the positioning keys to move the carriage and the position marker means.

7. A device as in claim 1, wherein the moving means includes:
   a carriage disposed underneath the contact plate, and
   a drive means, disposed underneath the contact plate, for moving the carriage in the line direction, the position marker means including a plurality of position markers on the carriage, one for each line, the position markers being aligned in the column direction, each position marker being actuatable to direct the light dot through the contact plate.

8. A device as defined in claim 7, wherein the positioning unit includes a frame underneath the contact plate, the drive means including:
   a first shaft mounted in the frame along one longitudinal side of the contact plate,
   a drive motor, and a second shaft forming a drive shaft driven by the drive motor, both mounted in the frame along another longitudinal side of the contact plate opposite the one side,
   first and second pulleys fixed to the drive shaft,
   first and second reversal rollers freely rotatably mounted on the first shaft, a first cable having opposite free ends fixed to the carriage, the first cable being trained over the first pulley and the first reversal roller, and a second cable having opposite free ends fixed to the carriage, the second cable being trained over the second pulley and the second reversal roller.

9. A device as in claim 7, wherein the positioning unit further comprises positioning keys disposed below a lower edge of the contact plate, the moving means being responsive to actuation of the positioning keys to move the carriage and to actuate a selected one of the position markers.

10. A device as in claim 1, wherein the position marker means comprises means for emitting light radiation.

11. A device as in claim 10 wherein the position marker means comprises at least one light emitting diode.

12. A device as in claim 11, wherein each light emitting diode has a triangular light exiting surface.

13. A device as in claim 1, wherein the positioning unit is pivotally mounted on an upper side of the printer.

14. A device as in claim 1, further comprising a computer/printer interface for coupling the computer to the printer to provide printing instructions to the printer during printing, the means for moving being coupled to the computer through the interface, so that the positions of the light dot with respect to the form on the plate correspond with the locations on the form at which the characters input to the operating memory and output during printing through the interface to the printer, are printed.

15. A device as in claim 1, further comprising an interface means coupling the computer to the printer to provide printing instructions to the printer during printing, the means for moving being coupled to the computer through the interface means, so that the positions of the light dot with respect to the form on the plate correspond with the locations on the form at which the characters input to the operating memory and output during printing through the interface means to the printer, are printed.

16. A device for use in a word processing station to be used to generate and/or imprint a form, the forms including fields to be imprinted upon and fields not to be imprinted upon, the word processing station including a computer having an operating memory, a keyboard for inputting into the operating memory characters to be stored and later read out for printing, a display device having a screen for displaying the characters input by the keyboard, and a printer for printing on the form the characters read out of the operating memory, the device comprising:

a positioning unit, including
a transparent contact plate onto which the form is placed during the inputting of characters, and
a position marker means, disposed underneath the contact plate, for directing a light dot through the contact plate onto the form; the light dot being movable parallel to the contact plate in column and line directions, in synchronism with movement of a cursor on the screen; and
means, coupled between the position marker means and the computer, for controlling the position of the light dot so as to be in synchronism with movement of the cursor on the screen.

17. A device as in claim 16, wherein the word processing station has a computer/printer interface and the controlling means includes a cable connecting the computer/printer interface with the position marker means.

18. A device as in claim 16, wherein the means for controlling includes a carriage, a rail-like carrier, the position marker means being fixed to the carriage, the carriage being oriented in the line direction, the carriage being mounted on the carrier for movement on the carriage in the line direction, the means for controlling further comprising a drive means for displacing the carriage in the line direction and displacing the carrier in the column direction, whereby the position marker means is movable underneath the contact plate in the line and column directions so that the light dot directed by the position marker means onto the form displays a position on the form which corresponds to the position of the cursor on the screen.

19. A device as in claim 16, wherein the means for controlling includes:
a carriage disposed underneath the contact plate, and
a drive means, disposed underneath the contact plate, for moving the carriage in the line direction, the position marker means including a plurality of position markers on the carriage, one for each line, the position markers being aligned in the column direction, each position marker being actuatable to direct the light dot through the contact plate.

* * * * *